United States Patent
Ellacott

[19]

[11] Patent Number: 5,899,997

[45] Date of Patent: May 4, 1999

[54] OBJECT-ORIENTED QUERY MECHANISM

[75] Inventor: Bruce A. Ellacott, Ottawa, Canada

[73] Assignee: Transparency Systems, Inc., Ottawa, Canada

[*] Notice: This patent is subject to a terminal disclaimer.

[21] Appl. No.: 08/831,152

[22] Filed: Apr. 1, 1997

Related U.S. Application Data

[63] Continuation-in-part of application No. 08/627,197, Apr. 3, 1996, Pat. No. 5,752,028.

[51] Int. Cl.⁶ .................................................. G06F 17/30
[52] U.S. Cl. .................................................. 707/103
[58] Field of Search .............................................. 707/103

[56] References Cited

U.S. PATENT DOCUMENTS

| | | | |
|---|---|---|---|
| 4,811,207 | 3/1989 | Hikita et al. | 707/2 |
| 5,212,787 | 5/1993 | Baker et al. | 707/101 |
| 5,291,583 | 3/1994 | Bapat | 707/103 |
| 5,313,629 | 5/1994 | Abraham et al. | 707/103 |
| 5,423,035 | 6/1995 | DePrez | 707/2 |
| 5,437,027 | 7/1995 | Bannon et al. | 707/103 |
| 5,446,886 | 8/1995 | Li | 707/2 |
| 5,471,629 | 11/1995 | Risch | 707/201 |
| 5,542,078 | 7/1996 | Martel et al. | 707/101 |
| 5,560,005 | 9/1996 | Hoover et al. | 707/10 |
| 5,564,119 | 10/1996 | Krawchuk et al. | 707/4 |
| 5,590,362 | 12/1996 | Baum et al. | 707/4 |
| 5,619,713 | 4/1997 | Baum et al. | 707/102 |
| 5,652,882 | 7/1997 | Doktor | 707/201 |
| 5,680,618 | 10/1997 | Freund | 707/7 |
| 5,694,593 | 12/1997 | Baclawske | 707/5 |
| 5,724,575 | 3/1998 | Moover et al. | 707/10 |
| 5,752,028 | 5/1998 | Ellacott | 707/103 |
| 5,819,084 | 10/1998 | Shapiro et al. | 707/10 |

OTHER PUBLICATIONS

International Search Report for Application PCT/CA 97/00214 of Jul. 18, 1997.

Deductive and Object–Oriented Databases, Elsevier Science Publishers, 1990, by Tanaka et al., pp. 297–311.

Primary Examiner—Wayne Amsbury
Attorney, Agent, or Firm—Alix, Yale & Ristas, LLP

[57] ABSTRACT

An asynchronous, non-blocking method for making joins and retrieving joined data during query processing in a database. A sending object sends a join message that specifies a criteria for a join to one or more receiving objects. Receiving objects process the join message with an associated function and potentially generate a result message, then stop processing. During this process the sending object does not wait for a reply from the receiving object before continuing with subsequent processing. Join messages can be placed in a join message queue with the results from the receiving objects being placed in a results queue. The query method can be used as a basis for an ad-hoc SQL query facility that is not dependant on a flat data structure. In particular, the methods of the present invention can be used for joining both the complex structures of an object-oriented database model and the flat structures of the relational database model.

28 Claims, 8 Drawing Sheets

Microfiche Appendix Included
(7 Microfiche, 382 Pages)

OBJECT-ORIENTED QUERY MECHANISM

CROSS-REFERENCE TO RELATED APPLICATION

This application is a continuation-in-part of application Ser. No. 08/627,197 filed Apr. 3, 1996, now U.S. Pat. No. 5,752,028.

MICROFICHE APPENDIX

The implementation source code of the methods of the present invention have been developed and are disclosed in a microfiche appendix entitled *Message Based Query Engine,* Transparency Systems Inc., March 1997, and is incorporated herein by reference. The microfiche appendix is a set of sheet microfiche of 382 frames contained on seven sheets numbered consecutively from #1 to #7.

FIELD OF THE INVENTION

This invention relates to data processing, and to a method for efficient processing of queries that attempt to combine and obtain pertinent data from a database.

BACKGROUND OF THE INVENTION

There are two database models currently in common use: the relational model and the object-oriented model. Both models organize the database into various database records.

In the relational model each record belongs to a table of a type specified by the database designer. There could be a customer table or an invoice table, for example. Every record in a particular table has the same structure, i.e., each record has the same fields. These fields are considered to be simple or atomic (i.e., fixed as integer, character, or date type fields). Fields cannot be, for example, a list of dates, or a set of integers. Tables of the relational model have a flat structure.

In the object-oriented database model a database record belongs to a database class, as opposed to a table in the relational model. A record is an "instance" of a class. The database records can be complex (i.e., the record is not limited to flat structures). A record attribute (i.e., field) can be a list, a set, an embedded structure, a list of structures, etc. An example of a list of structures would be a list of previous addresses where the address field itself has a structure such as: street address, city, zip code. In the object-oriented model records can vary in size. It would be possible to have a list of indefinite size, for example. Different records can have a variety of numbers of previous addresses, in the previous address list case.

The object-oriented model also adds the concept of subclassing. Here classes can be subclasses of other classes. A doctor class could have a pediatrician subclass and a podiatrist subclass. When a database record is from a class that is a subclass, it inherits the attributes (fields) of the super-class. The size of a record from the pediatrician subclass will generally be longer than a record from the doctor class.

To satisfy requests for information from a database, data from more than one database record often has to be combined. The object-oriented and relational models do this in different ways.

Figure 1:
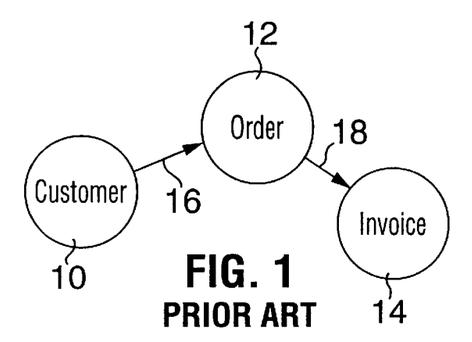
FIG. 1 illustrates a prior art pointer chasing join model for object-oriented databases.

In the object-oriented model data is combined from two or more database records by "pointer navigation" (also termed "pointer chasing"). FIG. 1 is a representation of the pointer navigation method. FIG. 1 illustrates a customer object 10, an order object 12, and an invoice object 14. There is an explicit pointer in one database record that points to another database record if there is a relationship between the two records. In FIG. 1, a pointer 16 defines a relationship between the customer object 10 and order object 12, and a pointer 18 defines a relationship between the order object 12 and the invoice object 14. The database management system, the software controlling the database, maintains the pointers 16 and 18 and uses them to retrieve related data from the two records.

Pointer chasing methods allows for fast retrieval of data. However, the pointer relationship must exist between two particular records for such retrieval to be possible. If a pointer relationship has not been previously established and maintained, no retrieval is possible. Many of the relationships between class instances are generally known at the time of the design of the database. In these cases the fast retrieval afforded by pointer chasing can be used. However, the pointer chasing method can not be used for ad hoc queries where the relationship of interest is an unexpected relationship. In general, object-oriented databases have generally weak query facilities and do not fully support industry standard Structured Query Language (SQL).

Figure 2:
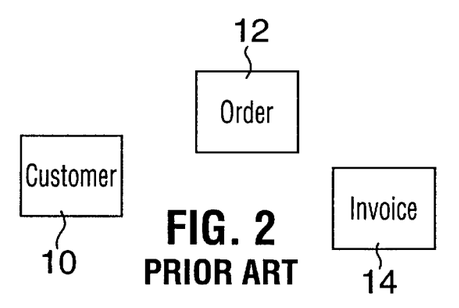
FIG. 2 illustrates a prior art model for relational databases.

Relational databases have greater flexibility with ad hoc queries. When relational databases combine data from the records of two tables they "join" the two tables. The result of such a join is a result table that can then be joined to another table, producing another result table, etc. Each relational table is independent in the sense that there are no explicit pointers from a record in one table to a record in another table. FIG. 2 illustrates the same entities 10, 12, and 14 discussed in conjunction with FIG. 1, however, no explicit pointer definitions between the entities 10–14 are defined.

In contrast, a relational join operates by specifying a condition between the values of the fields of one table against the values of the fields of another table. An "equi-join" for example, could join records of a customer table with those of an order table by joining on customer number. Each order record would have the customer number and the customer number would also be in a customer record. The standard SQL query language would specify:

SELECT * FROM customer, order WHERE customer.customer_number=order.customer_number;

where * means return all fields from all tables listed after the FROM command.

There are three basic processes used to join data in a relational database. The most common process is the nested loop operation where one table is used as the outer loop while the second table is used as the inner loop. A record is taken from the outer loop table and its values are checked against the values of each record of the inner loop table in succession. When a comparison passes the specified conditions, a result table record is written. After a full inner loop has occurred then the join operation moves to the next record in the outer loop. Indexes can improve the performance of the nested loop join. Rather than read though all the records of the inner loop, the comparison can look in the index for records that satisfy the join condition with the outer loop record.

The second process of joining data uses a hash join. This is generally used for relatively small tables where all the records can be cached in memory by hashing to a specific location in memory based on a record field.

The third process sorts and merges the two tables. This method is very inefficient for large tables.

The processes described above that are used for the relational join take advantage of the flat tabular structure of the relational model. With every record in a table having the same structure, each field is at the same displacement to quickly check field values.

In summary, the object-oriented database model is powerful in providing the ability to build complex fields to model real data more closely, and to improve programming efficiency and flexibility, however the query capabilities are generally limited to pointer chasing thereby severely limiting ad hoc query capabilities. The relational database model has very strong ad hoc querying capabilities, but is limited in terms of flexibility by the inherent field restrictions.

Recently extended-relational databases (also called object-relational, e.g. Informix™/Illustra™) have been developed to try to overcome the shortcomings of the relational model. These databases allow some complex data types but use traditional techniques for join processing. Likewise some object-oriented databases have been developed to decompose the complex objects in their databases into flat relational tables so that ad hoc relational queries can be processed. However, the decomposition of complex objects increases processing loads thereby limiting the advantages of the ad hoc query facility.

Message-based joins for object-oriented databases have been discussed by Tanaka, K. et al. in "On Natural Joins in Object-Oriented Databases", *Deductive and Object-oriented Databases*, Elsevier Science Publishers, 1990, incorporated herein by reference. A natural join is a special case of a join—where tuples have one or more fields with the same names and values and the results are reduced so that there is only tuple per two joined tuples. Tanaka et al. do not provide solutions for efficient processing for object composition operations including those not limited to natural joins in databases. Specifically, Tanaka et al. indicate in their paper that further research will be needed to develop efficient processing techniques for object composition operations including the natural join discussed in the paper.

There is a need for a method of joining complex objects efficiently in a database management system.

SUMMARY OF THE INVENTION

An object of the present invention is to provide an efficient method of combining data from different database records.

An object of a preferred form the present invention is to provide an efficient method of combining data from different database records in either a flat relational database model or a complex object-oriented database model.

In accordance with one aspect of the present invention there is provided a method of query processing in a database to combine data using a sending object and a receiving object, said method comprising: (a) sending a join message from the sending object to the receiver object within the database, said join message specifying a criteria for a join; and (b) processing the join message by a function associated with the receiving object to form a result, wherein said sending object does not wait for a reply from the receiving object for continuation of subsequent processing.

In accordance with another aspect of the present invention there is provided a method of creating non-blocking joins in a database, said method comprises: (a) sending a join message from a plurality of sending objects to a join message queue, the join message specifying a criteria for a join; and (b) processing the join message in the join message queue by a receiving object to form a result message.

In accordance with another aspect of the present invention there is provided in a distributed database having network nodes, the improvement in query processing comprises: (a) sending at least one message from a sending object on a first node to at least one receiving object on a second node; (b) said message being acted upon by a function associated with the receiving object to form at least one result; (c) each said result proceeding independently for further processing; (d) each sending object that has sent the message not awaiting for a reply from the receiving object; (d) maintaining a message count of unprocessed outstanding messages generated in steps (a) through (c) at each node that receives such messages, and (e) causing such node to notify all other nodes that have sent it messages when its local processing is complete.

In accordance with another aspect of the present invention there is provided a method of query processing in a database to combine and retrieve data using at least two objects; said method comprising: (a) sending at least one message from a first object to at least one second object within the database, said message specifying criteria for a join; (b) said message being acted upon by a function associated with the second object to form at least one output from each second object that has relevant data, each such output containing relevant data or a pointer to such relevant data; and (c) each said output proceeding independently either to another object as another message so said output can be acted up on by the method of such other object to form a further output or to a results object that stores results.

BRIEF DESCRIPTION OF THE DRAWINGS

Embodiments of the present invention will be discussed in conjunction with the following drawings in which.

DETAILED DESCRIPTION OF THE INVENTION

The present invention provides a method for combining data from two or more database records. For clarity, the following definitions are provided:

Object

The term object includes any storage of data that could be considered as a unit. This includes relational records, text files, objects in an object-oriented database, index entries and the like. The methods of the present invention treat all such units of data as objects in the object-oriented paradigm, where data is encapsulated within an object and functions (also called methods) can be evoked by sending messages to the object.

Objects can have complex nested structures, in which one or more objects are inside another object. If joins occur within an object for contained objects then either: (1) the contained object will be defined in the database as an instance of a separate object class and thus will be treated in the same way as other objects (i.e., messages will be passed to it); or (2) message passing will be handled by the internal function logic. The methods of the present invention are concerned with the "surface" interactions between objects.

Table

The relational model puts data entities in records. Records of the same type share a consistent tabular structure and are stored in tables. Only simple fields are allowed in a table (e.g., integer, character, date, etc.).

Class

In the object-oriented model, records of the same type belong to the same class. A class allows more complex attributes than a table such as lists, structures, and sets. A table is considered a special case of a class in the present application.

Field

A relational table record is composed of fields. The type of a field can be simple types such as integer, data, character, etc.

Attribute

A class instance (an object) contains attributes that store data. The type of attributes can be a complex type such as a list, set, etc. as well as the simple types listed above. The term field is used equivalently in the relational model, however, the possible types is more restrictive in the relational model. The terms field and attribute are used interchangeably in the present application.

Database records

Database records are considered, in the present application, as encapsulated objects, including objects that are actually stored in other databases as relational database records. The relational data record is considered as a subcase of the object-oriented data record in the present application.

Message-Passing Join Mechanism

Figure 3:
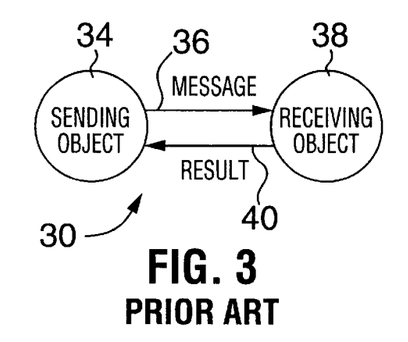
FIG. 3 illustrates a traditional join message model for databases.

FIG. 3 illustrates a classical object-oriented database model 30 is used to represent the principles of a message-passing join mechanism. Note that an object can either encapsulate both functions and data attributes, or an object can be associated with functions not per se encapsulated (i.e. in a function library). In the model 30, to cause the execution of a function in an object, a sending object 34 sends a message 36 to a receiving object 38 specifying a function and providing any parameters. A result 40 of the function's execution is returned back to the sending object 34, or more precisely back to the function that sent the message 36 in the sending object 34.

Figure 4:
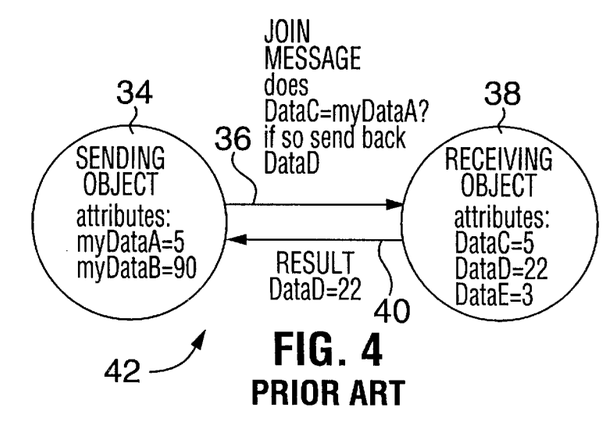
FIG. 4A illustrates a traditional simple query model for databases.
FIG. 4B illustrates query decomposition according to the present invention.

FIG. 4A illustrates a simple object-oriented query model 42 where the join message 36 specifies both a criteria for the join (does DataC=myDataA?) and data attributes (if criteria true send back DataD) that are to be returned from the receiving object 38. If the criteria is satisfied by the values of the attributes in the receiving object 38, the receiving object 38 sends back the requested attributes. In the example provided in FIG. 4A, the join criteria is true (i.e. DataC= 5=myDataA) therefore the receiving object 38 returns the request result (i.e. DataD=22).

Figure 4B:
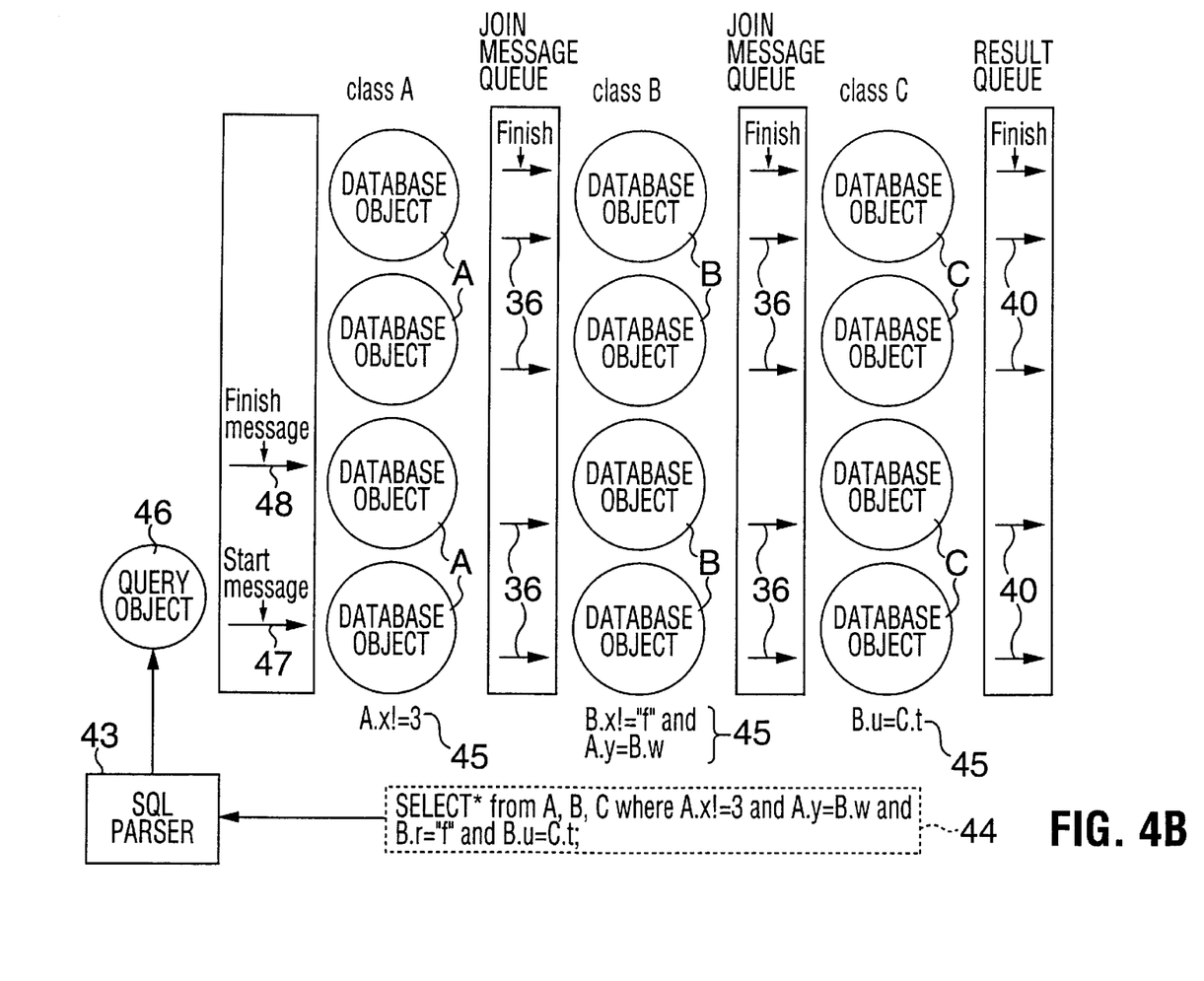

The general architecture for this invention decomposes a declarative query such as an SQL statement into a number of function executions in objects (or relational tables viewed as encapsulated objects). FIG. 4B provides an example of an implementation where an SQL parser 43 decomposes a SELECT statement 44 into function executions 45.

A query object 46 is created to coordinate this query execution and to contain the semantics for the list of function executions 45 (filterings, join criteria, attributes to retrieve, etc.). A start message 47 is sent from the query object 46 that refers to the first element and later elements of the function executions 45 (A.x!=3 for class A objects A, the join message criteria A.y=B.w, additional filtering for class B objects B, B.x="f", and the join criteria for the class B to class C join, B.u=C.t). The start message 47 is followed by a finish message 48. The finish message 48 trails the other join messages 36 as the query executes. The receipt of the finish message 48 by the last object C of class C indicates that the processing of data objects in the this query is finished.

Figure 5A:
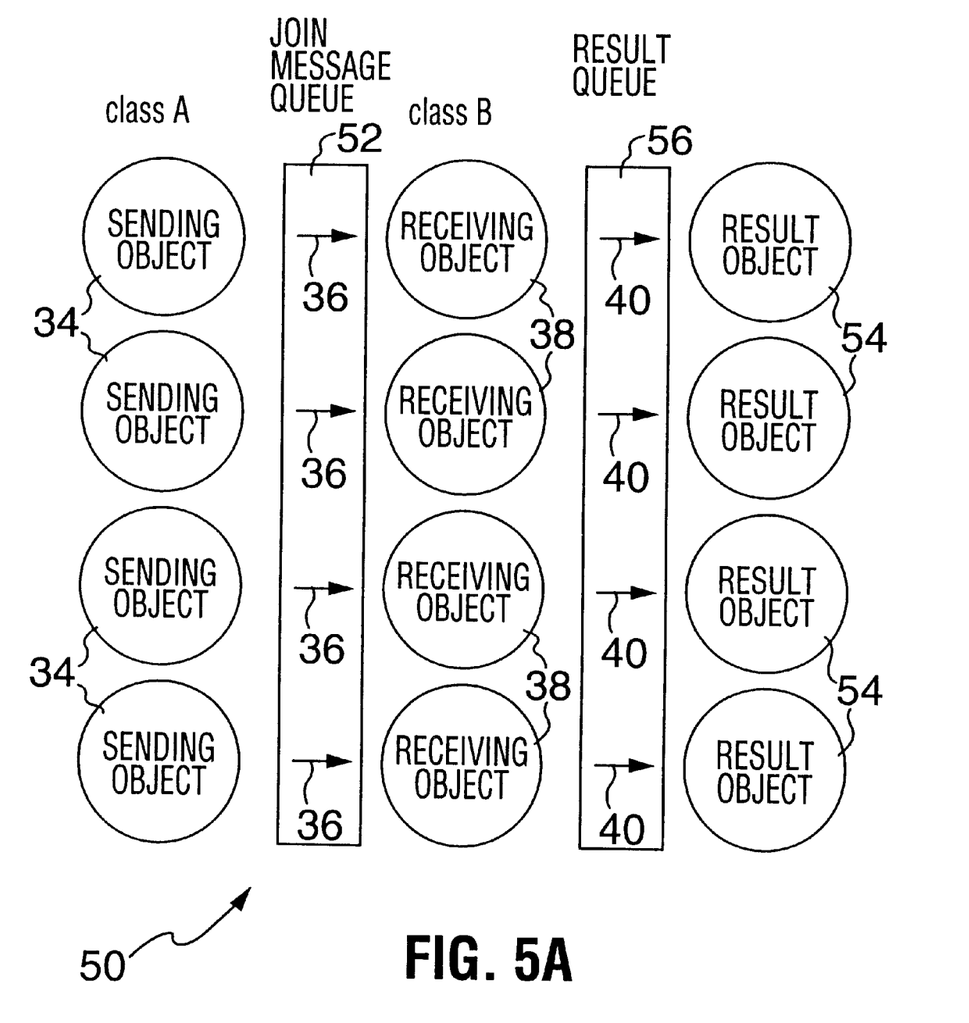
FIG. 5A illustrates a non-blocking query model for databases according to an embodiment of the present invention.

When there are many objects in a database, it is not possible for the function in the first object to wait for a result. This would be blocking and efficient execution of a query and joins between many objects would not be possible. FIG. 5A illustrates a non-blocking query method 50 according to an embodiment of the present invention where the sending object does not wait for a result from the receiving object.

To create non-blocking joins the sending objects 34 (of a class A) send the join messages 36 asynchronously via a message queue 52 to the receiving objects 38 (of a class B). The results 40 from the receiving objects 38 are transferred to a plurality of result objects 54 via a result queue 56. Data that needs to be used as criteria in the join from the sending object 34 is included in the join message 36 as discussed in conjunction with FIG. 4A. The result objects 54 can be stored in a database, or presented on a screen (not shown), etc. In more general terms, a join occurs between class A, or a subset of members of class A and class B, or a subset of members of class B.

The receiving objects 38 can also output directly to an output medium (file, Graphical User Interface (GUI) etc.) without using the result queue 56 or creating the result objects 54 depending on the design of the database application.

To process the join message 36, the receiving object 38 can retrieve any attribute within its own record structure and then compare to the join message criteria to determine whether to filter itself. Details about the particular structure of a complex object can be stored and retrieved by means known in the art. For example, a potentially unlimited size list can be stored on disk along with other complex object data using streamable classes, for example Tools.H++™ from RogueWave™ Software.

The query method 50 also enhances the possibilities to expand the join criteria. For example, a police force can join its suspect fingerprint data with the fingerprints found at the scene of a crime. A message including a graphic of a fingerprint can be sent from every "at_the_scene_fingerprint_object" to every "suspect_object". The message could be "compare the common features of this fingerprint with yours . . . if n features match return TRUE".

Figure 5B:
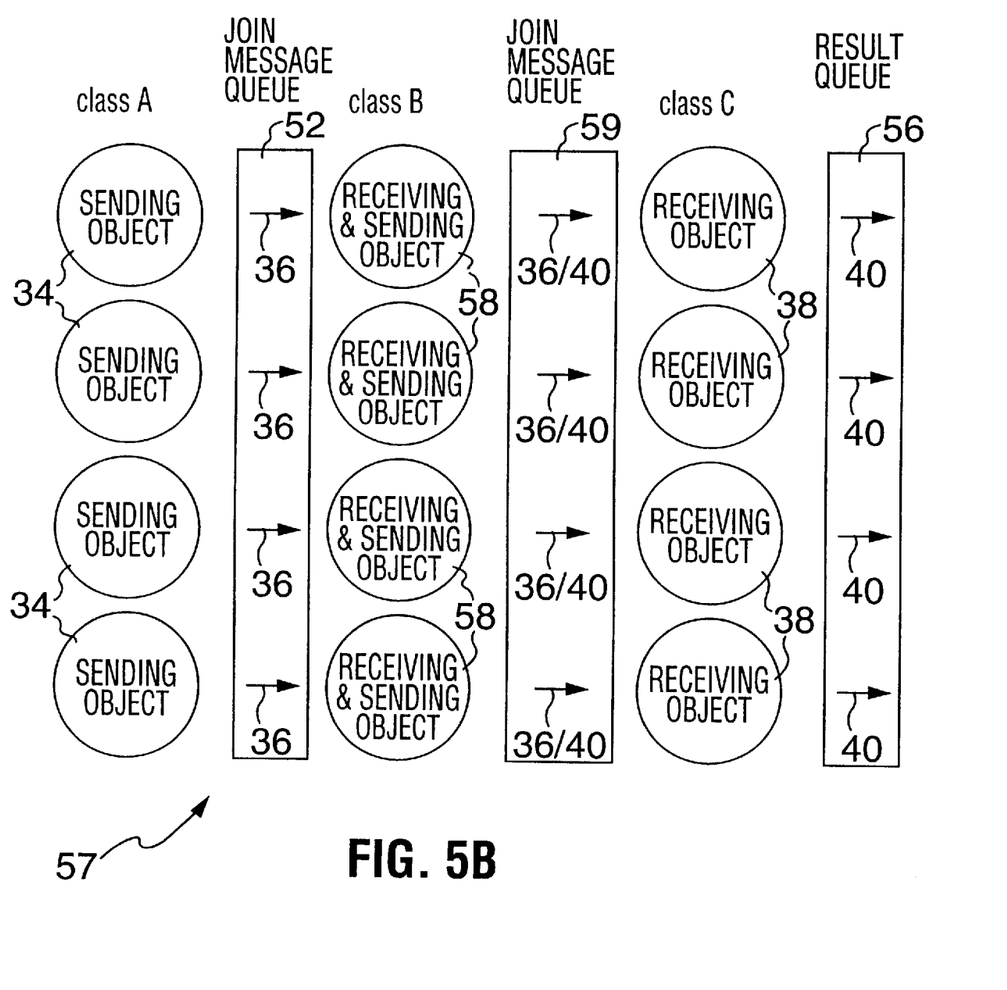
FIG. 5B illustrates a non-blocking linked query model for object-oriented databases according to another embodiment of the present invention.

FIG. 5B illustrates a non-blocking linked query model 57 where multiple joins are used. When there are multiple joins, as there are in many queries, each receiving object becomes a sending object (a receiving and sending object 58 in FIG. 5B) when it passes the join criteria of the join message 36 passed to it and any additional filtering criteria. The "converted" sending object 58 then passes both its results 40 and any data required for the new join massage 40 to the receiving object 38 (in class C) via a second join message queue 59.

Figure 6:
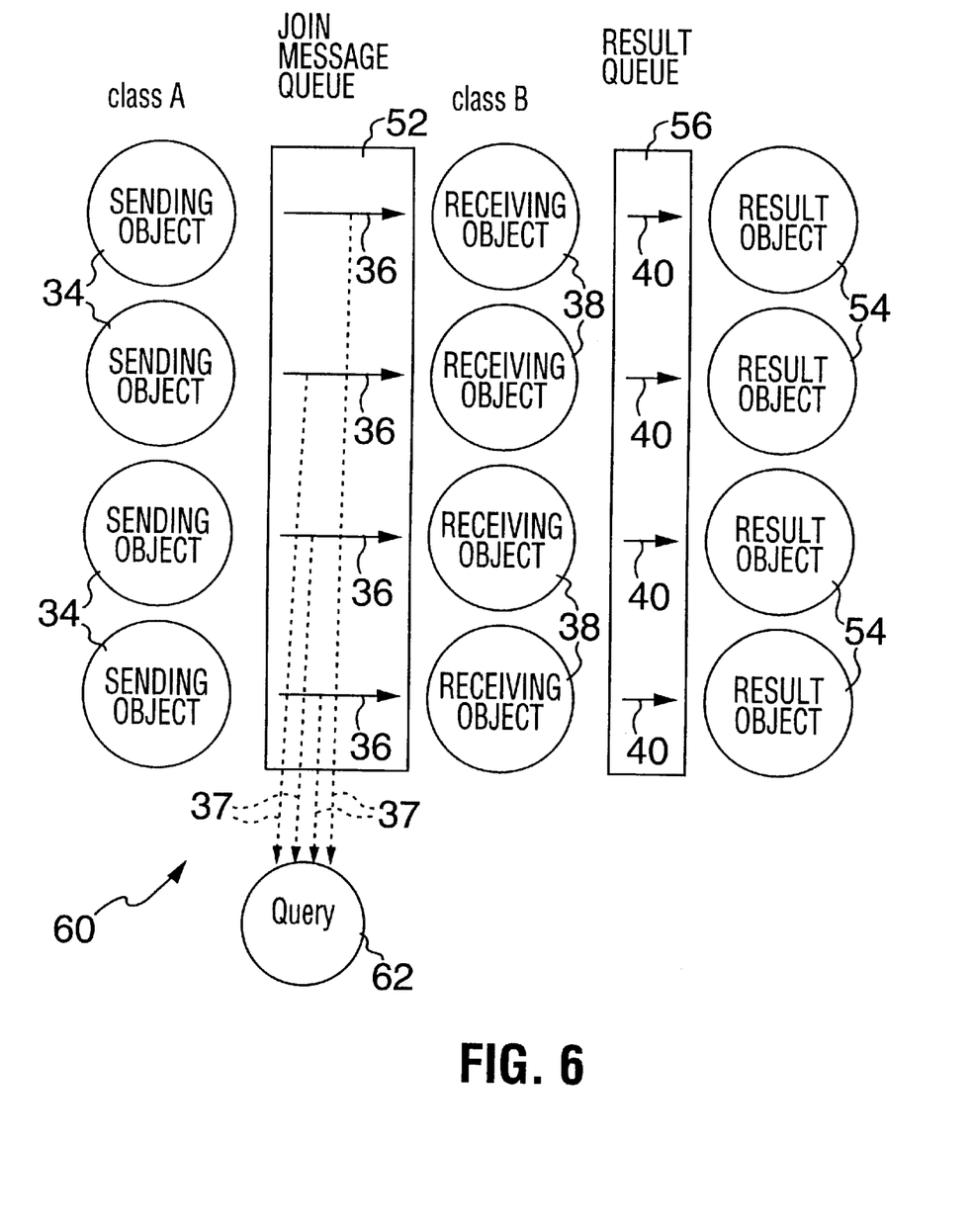
FIG. 6 illustrates an alternative of the non-blocking query model of FIG. 5A.

An alternative non-blocking query method 60 of the present invention is illustrated in FIG. 6. Rather than containing all the semantics of the query in every join message 36, a separate query object 62 contains the semantics data for the current query (including the specific join). This reduces the size of the join message 36. The join message 36 can contain a pointer 37 to the query object 62 or the use of the query object 62 can be implied.

For example, if the software objects are implemented in C++, all the C++ queue objects can be contained in one C++ query object. The parts of the semantics relevant to each receiving set of objects could be an entry in a list. The semantics of the query includes the attributes to be retrieved from particular objects (e.g. DataD in FIG. 4A) and the selection criteria. The selection criteria could be join criteria (e.g. DataC=DataA in FIG. 4A) or it could be additional filtering criteria on the receiving object (receiving object 38 of FIG. 4A-DataE could also be required to not equal 11).

Unindexed Joins Option 1

The query methods 50 and 60 can significantly reduce input/output processing effort in the way that the receiving object 38 processes the join messages 36 on the queue 52. This is accomplished, in general, by reducing the number of times a data object is read during a join. To illustrate, consider the case of an unindexed join (every join message 36 from each sending object 34 is addressed commonly to every receiving object 38 in class B).

As discussed above in conjunction with FIGS. 5A and 6, the join message queue 52 is associated with class B. When join messages 36 are available on the queue 52, the receiving object 38 instantiates (creates) itself in memory as it retrieves its data from some persistent storage (not shown) through an access mechanism known in the art (such as btree, ODBC and the like). The receiving object's function associated with the join message 36 reads the first message on the queue 52 and then filters the object based on the object data, the message parameters, and the join semantics.

It is possible that a particular database object can be filtered entirely before reading any join messages because part of the query criteria eliminates on specific values for object attributes or a combination of object attributes independently of any join criteria. (e.g., WHERE A.field1= B.field2 AND fieldX !=2, so if the object has the value 2 ignore it.)

If the object passes the filtering, the function copies any data from the current message, which is needed in the final result, into either a new join message or a result message (depending on whether there are additional joins required). The function also adds to this new message any additional data from the current object that is required as part of the query results or as parameters to the next join. The function then sends the new message to the queue associated with the class of the next join or to the result queue 56 (again depending on whether there is a next join or not).

Before passing on to the next (physical record) object of the class, the function reads and processes all the join messages 36 available in the message queue 52, processing them as with the first message. In some cases the current data object will be filtered out depending on the parameters passed in the join message 36. In other cases secondary join messages or result messages can be passed on.

When all the join messages 36 in the message queue 52 have been processed, the function reads the next data object and processes all the join messages 36 in the message queue 52 before reading the next data object. When all data objects of class B have read and processed all of the join messages 36 in the message queue 52, the queue 52 is emptied. Because the message queue 52 may not be able to hold all of the join messages 36 from the sending object class A at once, the queue 52 may need to be refilled as the last sending object 34 of class A resumes sending a join message (the sending object's process was waiting because of a full message queue 52). When the queue 52 is ready, the receiving object's function starts at the first record of the file (i.e. first data object of class B) again, processing all the available join messages 36 as discussed above.

There are a number of variations and optimizations possible with the queue processing. How many join messages to handle in a group, for example. Whether to wait until the queue 52 is completely full, half full etc. Whether to wait at all or take each message as soon as it becomes available. Hypothetically many processes could be executing in parallel, even one for each object in both sending and receiving classes. One process thread could read and process messages directed to one data object while another thread executing concurrently could be reading the next data objects (this overlaps processing with input/output).

The software implementation (refer to implementation and environment section below) of the unindexed join uses a slight difference between the receiving program object and a database object. The data objects in this implementation are retrieved via a Open Database Connectivity (ODBC) standard protocol. The receiving program object populates itself internally with database record object data, starting with the first record in the file. When the program object function has processed all messages directed to this first database object, the program object does not destroy itself but rather reads the next database record object, again populating itself internally with the database record data. Thus the program object "mutates" from one database object to the next database object in the file. This allows the program to loop efficiently through all of the messages for all of the database objects of one class (or relational table) without re-creating software objects many times.

Indexed Joins

Indexes can be joined with other indexes or with objects of a data file (instances of a class or table records). Index entries also can be considered as objects. In particular, they are subsets of the objects they refer to plus some pointer to those objects. The join methods 50 and 60 can use index entries as either sending objects or receiving objects or both.

Figure 7:
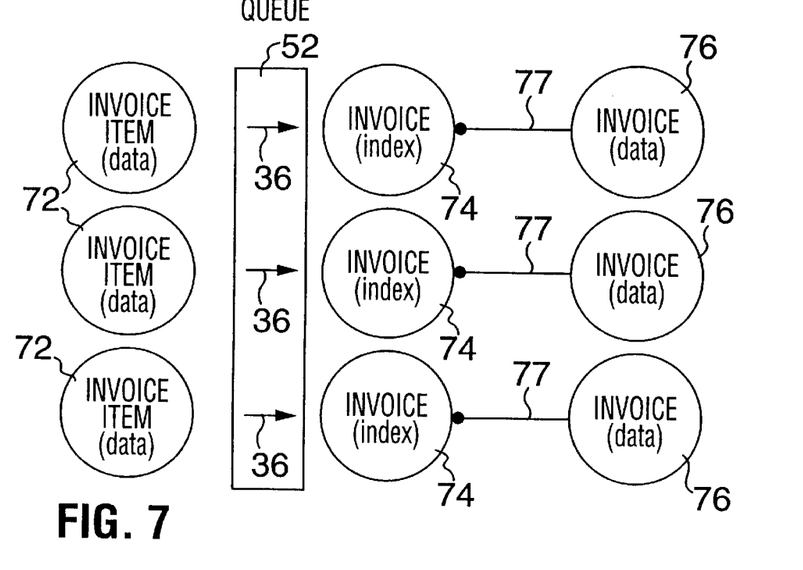
FIG. 7 illustrates an example of the non-blocking query model of FIG. 5A.

FIG. 7 illustrates a plurality of invoice items 72 as sender data objects with indexes 74 on invoices as receiving objects. Each invoice entry in the index (each receiving object) can be viewed as containing an invoice data object 76—the full invoice object (the solid circle and line 77 indicates logical containment). In other situations an index entry object could contain multiple data objects (e.g. sex= male on a personnel file). When we retrieve an index entry the invoice is: (a) filtered on additional data in the data object component; or (b) retrieve additional invoice data attributes to send on to results or as additional parameters in subsequent joins. An example SQL statement could be:

```
SELECT * FROM invoice, invoice_item WHERE
invoice.invoice_no = invoice_item.invoice_no AND
invoice_item.amount > $200.00.
```

Assume that there is also another index for the attribute AMOUNT of the INVOICE_ITEMs. This has already restricted the set of INVOICE_ITEMs, which must send join messages 36 to the queue 52. The join message criteria is a match on INVOICE_NO. The receiver index is unique on INVOICE_NO. There could be multiple join messages per specific INVOICE_NO. Each sender INVOICE_ITEM object sends a message directed to a specific receiver INVOICE object. This contrasts with the unindexed join where each message is directed to every object in the receiver class/table. As indicated above in other situations (such as sex=male) a message might be directed to multiple but not all objects in a class/table.

Instead of a sequentially ordered queue the messages for an indexed join could be sent to a hash bucket queue. In general, a file or queue could be organized in hash buckets by taking an input key applying a hashing algorithm to obtain a hash bucket number—a technique known in the art. This could be a hash table where the attribute(s) used for joining is hashed to a hash bucket based on a hashing algorithm. The hash table/queue must also be able to be read sequentially. Other means of organizing an in-memory file for access via a key and sequentially could be used also such as an in-memory btree file organization, bit-index, and the like.

After the queue/table is ready, i.e., has sufficient messages in it for optimal processing, the queue/table is read in sequential order one hash bucket at a time (or one group of messages at a time if btree or some other in-memory file organization is used). Each bucket or message group is directed to one receiving index object. In other situations it could be directed to multiple indexed objects (e.g. sex= male).

Unindexed Joins Option 2

Figure 8:
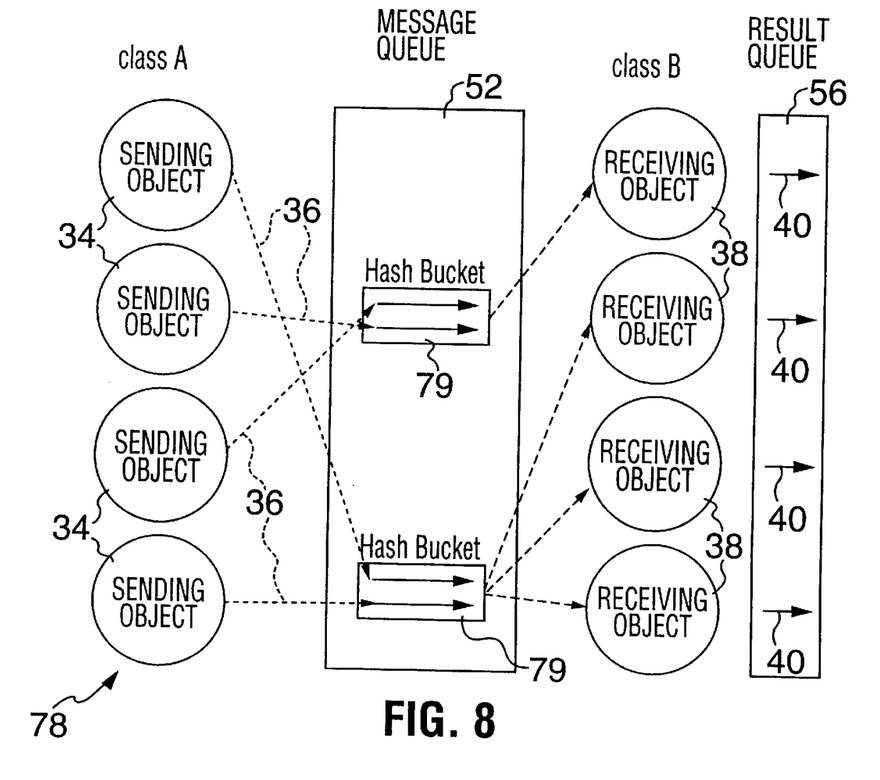
FIG. 8 illustrates a non-blocking query model using hash buckets according to another embodiment of the present invention.

FIG. 8 illustrates an alternative non-blocking query model 78 using hash buckets.

Accessing the messages 36 on the message queue 52 can be optimized for unindexed joins by using a queue organized as a hash table, an in-memory btree, or some other means of facilitating quick access to the queue such as bit-indexes. This is similar to the use of such methods for indexed joins, as described above but instead of reading the hash queue sequentially when it is "ready" the processing is driven by a sequential reading of the receiving objects' data file (class or table storage whatever it may be).

Specifically, instead of a sequentially ordered queue, the messages 36 for an unindexed join would be sent to a hash bucket queue 79. (Classes for hash queues are available from RogueWave™ and other software suppliers). This could be a hash table where the attribute (or attributes) used for joining is hashed to the hash bucket 79 based on some hashing algorithm. (This hashing process is well known in the art). The hash bucket queue 79 is considered to be an intermediate storage mechanism that facilitates asynchronous receipt of messages from sending objects.

After the queue/table is ready, i.e., has sufficient messages in it for optimal processing, the receiving objects class/table is read in sequential order as described above for the unindexed join option 1. The attributes of the first data object that the semantics of the query specify as being the criteria for the join can be hashed to give the hash bucket 79 for this data object. (i.e., this can be viewed as a mail box for the receiving object 38). Any messages in this hash bucket 79 can be processed by this receiving data object before the next data object in the file (i.e., receiving object class/table) itself hashes its relevant attributes to produce its hash bucket. This object processes its messages before passing on to the next object, etc. When all the objects in the receiving objects' file have looked at their respective hash buckets 79 and have processed their messages, the hash queue is emptied. If the sending objects' file has not completed sending join messages, as in the earlier version of the unindexed join described above, the next sending object 34 sends its join message 36, hashed to the appropriate hash bucket 79. This refilling of the hash queue will continue until the end of the sending objects' file. (With potential pauses should the queue become "full", recommencement of processing by the receiving objects, emptying of the queue, recommencement of sending join messages by the next sending objects, etc.)

Multiple sending objects 34 could be sending join messages 36 to multiple receiving objects 38. Because so-called synonyms could occur when using hash buckets 79, the receiving object 38 would also need to test that the message 36 was in fact directed to that object (the join criteria were satisfied by its data attributes). By reducing the number of messages that the receiving object must test, this hash technique can further reduce processing.

The query methods of the present invention are particularly useful when implemented on a multiple processor system and especially when distributed on different machines. Messages arrive in a queue and a task processes the queue message (as described above). The queues can be processed concurrently by multiple tasks, for example one for each queue one for each sub-queue, or even hypothetically one for each receiving object.

On different machines (i.e. distributed databases) this message-based model can be used efficiently. Instead of passing join messages to a queue within the same process, the messages are passed to a queue on a different machine, then to be processed by a process processing join messages.

Figure 9:
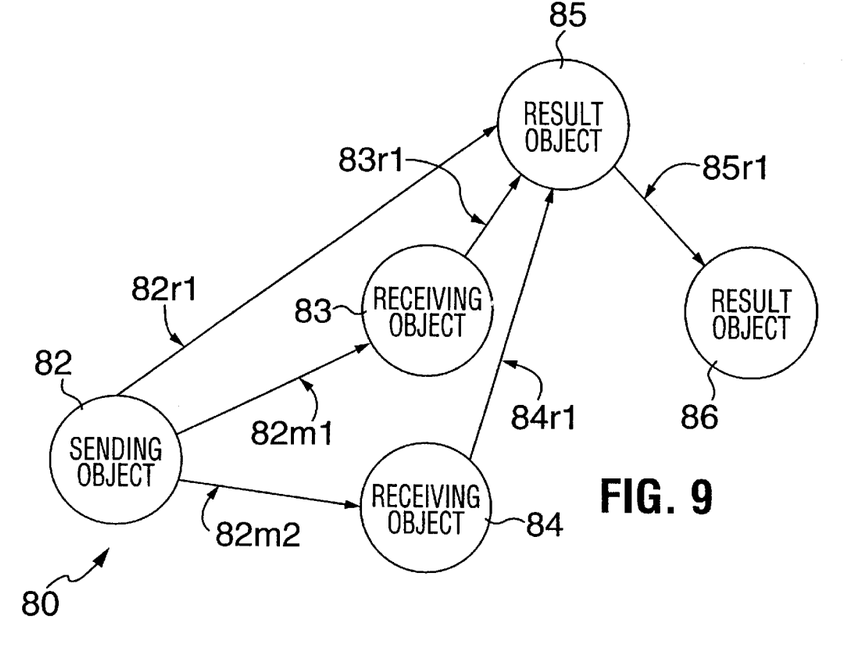
FIG. 9 is a schematic representation of messages passing between objects according to another embodiment of the present invention.
Figure 10:
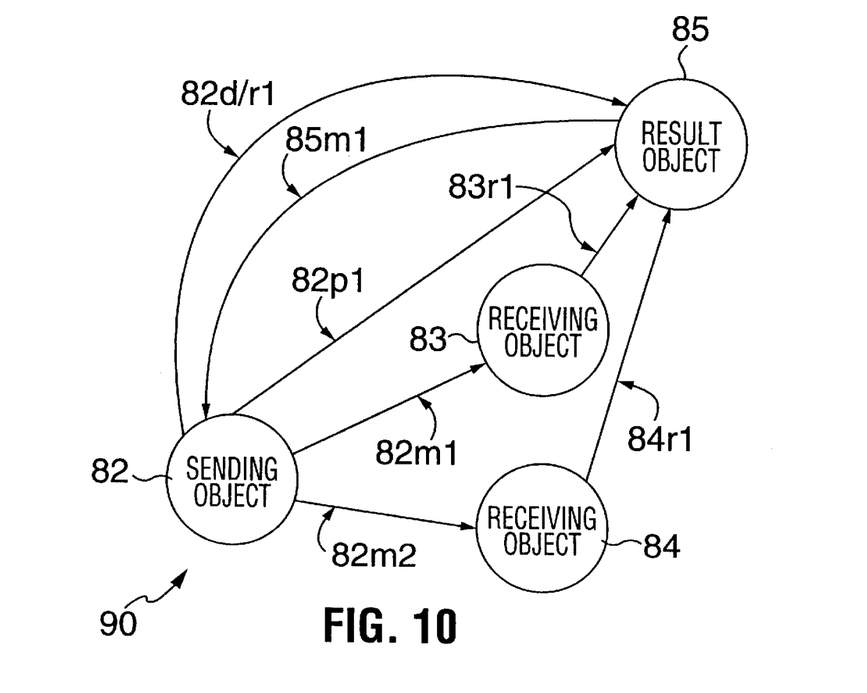
FIG. 10 is a schematic representation of messages passing between objects according a variation of the embodiment of FIG. 8.

FIGS. 9 and 10 illustrate alternative query models 80 and 90, respectively. These models 80 and 90 illustrate situations where a result object can be composed from joins in multiple directions. This could be useful in composing a result object from data objects in a hierarchy (e.g. parent object, son object, daughter object). In general, a sending object can pass a pointer in the message to a receiving object that will tell the receiving object where to send the results. Alternately, an equivalent means of specifying location can be used, or a location instruction can be intrinsic to the database management system. The sending object also will pass its results to the result object. The results can be for example sending object data including object pointers, or data derived from sending object data including a boolean yes or no from a predicate evaluation.

At the time a query is generated into possibly multiple functions the structure (defined type) of the function result will be known. Therefore, the result object's structure can be defined before the query is executed. A defined query can be a class in the database. When the query is executed an instance of this class can be created and populated. The result object can itself have functions. When these functions are executed secondary objects might be created. The execution of functions on result objects would be treated in the same way as the execution of functions for other objects in the database—message queue, non-blocking, etc., if desired, a series of result objects can be created.

More specifically, to illustrate the query method 80 (FIG. 8), assume that a sending object 82 must send a message $82_{m1}$ to receiving object 83 and a message $82_{m2}$ to receiving object 84 before it can determine where further processing is required within object 82 so that derived data form object 82 can be returned. This can be implemented as generated functions for objects 82, 83, 84, and a result object 85 such that object 82 sends the two messages $82_{m1}$, $82_{m2}$, then sends data that may be needed for further processing (result $82_{r1}$) to result object 85.

When object 83 is finished its processing, it sends a result message $83_{r1}$ to result object 85. Object 84 also sends a result message $84_{r1}$ when it completes processing. Object 83 could complete processing before object 84 or visa versa. Therefore, the various results messages ($82_{r1}$, $83_{r1}$, $84_{r1}$) passed to the result object 85 evokes separate functions in the result object 85. Each of the functions determines whether the other has completed, by the presence of result data for the other in the result object 85. If not, each just stores its separate result data in the result object 85. If however, the other has completed, then further processing continues within result object 85, either with the presently executing function or by evoking another function in result object 85 such that a result object 86 is created and a result message $85_{r1}$ 6 is sent to it. The result object 86, in this example, then holds the result of the query, and can output it as desired.

A variation of this processing scheme is shown in FIG. 9. The basic message passing scheme discussed above in conjunction with FIG. 8 applies, however, in this variation, the method 90 performed in the result object 85 modifies the result object 85 place and does not create the result object 86. The method 90 can stop here, with the result object 85 holding the result of the query and outputting as desired. However, for further exemplification, in this example the sending object 82 sends a pointer $82_{p1}$ back to itself rather than sending all the data needed for further processing (as was done by the result message $82_{r1}$ in FIG. 8). This requires another message $85_{m1}$ to pass from the result object 85 back to the object 82 (which this time functions as a server). Object 82 can then pass its data unprocessed back to the result object 85 or process the data within itself and then pass back a result message or data $82_{d/r1}$ to the result object 85.

The object functions that together comprise the queries discussed in this application can be coded directly for the software objects representing the database object classes concerned. The functions are compiled and stored ready to be dispatched as the query executes, or else source code can be executed in an interpretive fashion. Alternately, a declarative query in for example, SQL can be used to generate (in an ad hoc fashion) methods for the object classes of its query request. These methods also can be compiled and stored so as to be ready to be dispatched as the query executes, or executed in an interpretive fashion (e.g. using some interpretive language like JAVA™).

With the asynchronous message passing methods described in this application, a means of knowing that all messages were processed and that the query is finished is achieved by using a count of messages generated but not processed. Each time a new message is generated in a function the message count is incremented. Whenever a message completes processing, the count is decremented. When the count reaches zero the query is complete. In a distributed implementation (i.e. a query including multiple distributed databases) counts could be kept by database and by overall query. Alternatively, a 'finished' message could be sent as the last message on the very first queue when this finished message arrives at the last function processing join messages the query is considered finished, as discussed in conjunction with FIG. 4B.

EXAMPLE

The example which follows is intended to illustrate the invention without imposing any limitation.

The following example compares the database efficiency of the message-based query method (unindexed join option 1) of the present invention to a traditional relational nested-loop process.

Figure 11:
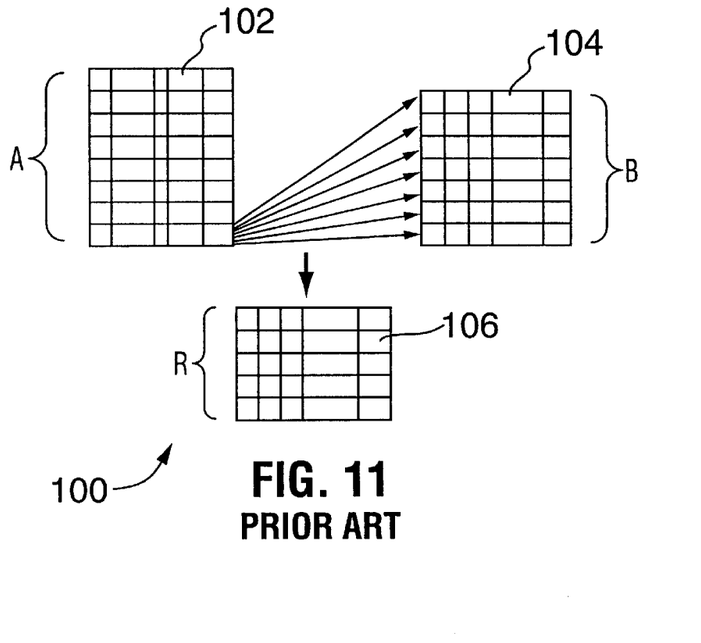
FIG. 11 illustrates an example of the prior art relational join process.

Database efficiency is generally input/output (I/O) bound (i.e. processing is mainly hidden by input and output processing). FIG. 11 illustrates a schematic representation of a traditional relational nested-loop process 100. In the present example, a table 102 is joined to a table 104 to produce a result table 106. The following assumptions are made: (a) the physical records are identical and (b) the logical records are equal to the physical records. The input/output processing load for a relational join is defined approximately as:

$$I/O_{RJ} \approx A*B+A+R, \qquad (1)$$

where A is equal to the number of records in the outer loop, B is equal to the number of records in the inner loop, and R is equal to the number of records in the result table 106.

Figure 12:
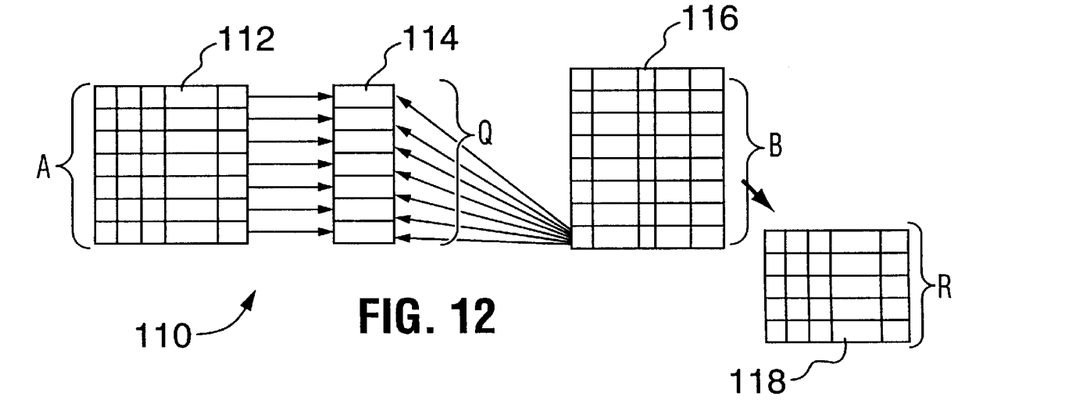
FIG. 12 illustrates an example of a non-blocking query model according to the invention.

FIG. 12 illustrates a schematic representation of a message-based join method 110 according to the unindexed option 1 method of the present invention. Each object A of a table 112 sends one message to all records B of a table 116 via a queue 114.

Each B object processes all its messages in the queue 114 before the next B object does the same. The input/output processing load for this approach is defined approximately as:

$$I/O_{MB} \approx A+B+R, \qquad (2)$$

where A is equal to the number of records in the first class, B is equal to the number of records in the second class, and R is equal to the number of records in the result. Equation 2 assumes that the queue 114 is sufficiently large (i.e. there is not a limitation on memory—i.e. all messages can be accommodated in the queue).

If the queue 114 cannot take all messages than equation 2 is modified to:

$$I/O_{MB} \approx (A*B)/Q+A+R, \qquad (3)$$

where A is equal to the number of records in the first class, B is equal to the number of records in the second class, R is equal to the number of records in the result, and Q is the number of physical objects the queue 114 can receive messages from.

In summary, the method 110 of the present invention is more efficient in I/O as soon as the queue can hold more than one message. It is significantly more efficient in I/O with a large queue.

In summary, the present invention provides a new mechanism for combining data from two or more database records. It is similar to the relational approach in its ability to specify join criteria in an ad hoc fashion. Therefore, the disclosed methods can be used as the basis for an ad hoc SQL query facility for object-oriented database models. Further, because the disclosed methods are not dependent on a consistently flat structure they are more flexible for joining both the complex structures of object-oriented data and the flat structures of relational data.

The referenced source code provided in the Microfiche Appendix was developed on a Intel based pentium computer running Microsoft NT™ 4.0 Workstation. The compiler used was IBM Visual Age™ C++ version 3.5 with IBM Open Classes™. Utility classes Tools.h++ version 7 from RogueWave Software were also used along with the SQL parser, Visual Parse++™ version 2.0 from SandStone™ Technology. Btrieve™ 6.15 from Pervasive Software was used for the local storage data objects. ODBC access was gained using the ODBC client stacks available in Windows NT 4.0.

What is claimed is:

1. A method of query processing in a database to combine data using a sending object and a receiving object, said method comprising:
   (a) sending a join message from the sending object to the receiver object within the database, said join message specifying a criteria for a join; and
   (b) processing the join message by a function associated with the receiving object to form a result, wherein said sending object does not wait for a reply from the receiving object for continuation of subsequent processing.

2. The method of claim 1, wherein the result from the receiving object proceeds to another object as another join message so that said result can be acted on by another function.

3. The method of claim 1, wherein the result from the receiving object is stored in an electronically readable medium.

4. The method of claim 1, wherein the result from the receiving object is displayed to a graphical user interface.

5. The method of claim 1, wherein the join message includes data attributes to be returned in the result from the receiving object when the criteria in the join message is satisfied.

6. A method of creating non-blocking joins in a database, said method comprises:
   (a) sending a join message from a plurality of sending objects to a join message queue, the join message specifying a criteria for a join; and
   (b) processing the join message in the join message queue by a receiving object to form a result message.

7. The method of claim 6, wherein the result message is stored in a result queue and a result object is created associated with each result message.

8. The method of claim 6, wherein to process the join message the receiving object retrieves an attribute within its own record structure and compares to the criteria of the join to determine whether to filter itself.

9. The method of claim 6, wherein the join message is associated with semantics data for the query, said semantics data defining the meaning of the join message.

10. The method of claim 6, wherein the join message facilitates retrieval of data by the receiving object from the sending object.

11. The method of claim 8, wherein the receiving object is filtered using a filtering criteria established outside of the criteria for the join.

12. The method of claim 11, wherein data from the join message is copied into a the result message when the filtering criteria and the criteria for the join are satisfied.

13. The method of claim 11, wherein the receiving object stops processing when either the filtering criteria fails or the criteria for the join fails.

14. The method of claim 9, further comprising the step of storing the semantics data from the join message associated with the join message queue.

15. The method of claim 6, wherein the join message is sent to an intermediate storage mechanism; the receiving object retrieving and processing asynchronously the join message from said intermediate storage mechanism.

16. The method of claim 15, wherein the intermediate storage mechanism is organized for retrieval based on a technique selected from the group consisting of: hash buckets, B-tree, and bit-indexes.

17. In a distributed database having network nodes, the improvement in query processing comprises:
   (a) sending at least one message from a sending object on a first node to at least one receiving object on a second node;
   (b) said message being acted upon by a function associated with the receiving object to form at least one result;
   (c) each said result proceeding independently for further processing;
   (d) each sending object that has sent the message not awaiting for a reply from the receiving object;
   (d) maintaining a message count of unprocessed outstanding messages generated in steps (a) through (c) at each node that receives such messages, and
   (e) causing such node to notify all other nodes that have sent it messages when its local processing is complete.

18. The method of claim 17, wherein the step of further processing includes sending the result to another object as another join message so said result can be acted on by a function of such other object to form a further result.

19. The method of claim 18, wherein the step of further processing includes sending the result to a results object.

20. A method of query processing in a database to combine and retrieve data using at least two objects; said method comprising:
   (a) sending at least one message from a first object to at least one second object within the database, said message specifying criteria for a join;
   (b) said message being acted upon by a function associated with the second object to form at least one output from each second object that has relevant data, each such output containing relevant data or a pointer to such relevant data; and
   (c) each said output proceeding independently either to another object as another message so said output can be acted up on by the method of such other object to form a further output or to a results object that stores results.

21. The method of claim 20, in which data which is related or potentially related to the data sought is sent to a results object.

22. A method as claimed in claim 20, in which an object having data which is related or potentially related to the query sends a pointer to the results object, whereby the results object can locate the object with the potentially useful data should the data be required to respond to the query.

23. A method as claimed in claim 20, in which a message is sent out in step (a) of claim 1 to all objects within a class of objects.

24. A method as claimed in claim 20, in which a plurality of messages is sent out during step (a) of claim 1, and some such messages are sent to individual objects and others are sent to groups of objects, and each said second object which receives both types of messages processes both types of messages from a queue.

25. A message as claimed in claim 24, in which the messages are accorded different priorities for processing according to whether they are messages to a group of objects or to said individual second object.

26. A method as claimed in claim 20, in which some messages as set out in step (a) of claim 1 are accorded different priorities, and such priorities are used to order messages in a queue for processing.

27. A method as claimed in claim 20, including the step of coordinating the processing of messages directed to groups of objects with the processing of messages directed to individual objects so that an individual second object is retrieved from physical storage to be processed by a thread, all messages directed to that individual object and directed to the groups of objects which include that object are processed as they relate to that object, and one or more output messages are generated by that object as set out in step (b) of claim 17 prior to processing of another second object by the thread.

28. The method of claim 20, which includes the additional step of maintaining counts of unprocessed outstanding messages generated in steps (a), through (d) and reporting that the query has been completed when such counts are all zero.

* * * * *